United States Patent [19]

An

[11] Patent Number: 5,035,496
[45] Date of Patent: Jul. 30, 1991

[54] OUTSIDE BACK MIRROR DEVICE FOR USE IN AN AUTOMOBILE

[75] Inventor: Moon Houy An, Seoul, Rep. of Korea

[73] Assignee: Duk Yu Industrial Co., Ltd., Seoul, Rep. of Korea

[21] Appl. No.: 505,506

[22] Filed: Apr. 6, 1990

[30] Foreign Application Priority Data

Apr. 27, 1989 [KR] Rep. of Korea ............... 1989-5290

[51] Int. Cl.⁵ .................................... G02B 7/18
[52] U.S. Cl. .................................. 350/605; 350/632; 350/637
[58] Field of Search ................ 350/605, 606, 632, 637

[56] References Cited

U.S. PATENT DOCUMENTS 4,171,875  10/1979  Taylor et al. .............. 350/637
4,469,406  9/1984  Mittlehauser ............. 350/632

FOREIGN PATENT DOCUMENTS 2036818  1/1972  Fed. Rep. of Germany ...... 350/637
3509654  9/1986  Fed. Rep. of Germany ...... 350/637

Primary Examiner—Bruce Y. Arnold
Assistant Examiner—J. P. Ryan
Attorney, Agent, or Firm—Birch, Stewart, Kolasch & Birch

[57] ABSTRACT

An outside back mirror device for use in an automobile which comprises an outside back mirror casing, a solenoid actuated by a drive circuit for turning on and off the power source for a certain time period, a hydraulic member for receiving the force applied by the solenoid so as to make a mirror move, a shock absorber for delaying the return of the mirror to its original position, and an elastic member including a fixing bolt and a spring for causing the mirror to return to its original position.

6 Claims, 5 Drawing Sheets

OUTSIDE BACK MIRROR DEVICE FOR USE IN AN AUTOMOBILE

BACKGROUND OF THE INVENTION

1. Field of the Invention

The present invention relates to an outside back mirror device for use in an automobile which makes it possible to ascertain by its movement the range of observation which cannot be ascertained by the outside back mirror mounted to an automobile when the automobile changes its proceeding direction and a traffic lane or when it passes along a principal road connected with its running road and along a ramp. More particularly, the present invention relates to an outside back mirror device for use in an automobile which is automatically placed at a proper angle for a given period of time to extend the range of observation when the automobile changes its proceeding direction and at the normal position when the automobile makes a straight drive. Thus, the driver's view can be widened by making his range of variable observation.

2. Description of the Prior Art

In the case where the outside back mirror is mounted to an automobile, the range of driver's observation therethrough when the automobile comes out to its travelling road from a ramp as shown in FIG. 1(a) is suddenly narrowed as shown by a blind spot. When a traffic lane is changed as shown in FIG. 1(c), close watch must be kept on it because the rearward range of automobile which can be observed by the existing outside back mirror is narrow.

In the case of FIG. 1(a) and FIG. 1(c), an automobile accident happens unless particular care is taken. Accordingly, the driver must take great care by looking back or sticking his head out of the window in order to observe the blind spot which cannot be ascertained by the outside back mirror. Such an act causes not only danger to safe traffic but also fatigue to the driver. Thus, the reflecting range of the outside back mirror mounted to the automobile is low in efficiency, thereby causing a traffic accident and exhaustion on the part of the driver.

SUMMARY OF THE INVENTION

Accordingly, it is an object of the present invention to provide an improved outside back mirror device for use in an automobile.

Another object of the present invention is to provide an outside back mirror device for solving such problems as described hereinabove so as to widen the range of observation without having trouble to look back or to stick his head out of the window on the part of the driver to ascertain the rear when the driver changes a traffic lane or enters the principal road or the ramp leading thereinto.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an outside back mirror device for use in an automobile which comprises an outside back mirror casing, a hydraulic member for for receiving the force applied by a solenoid so as to make a mirror move, the solenoid connected to a drive circuit for turning on and off the power source for a certain time period, a shock absorber for delaying the return of the outside back mirror to its original position, and an elastic member including a fixing bolt and a spring for causing the outside back mirror to return to its original position.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2A:
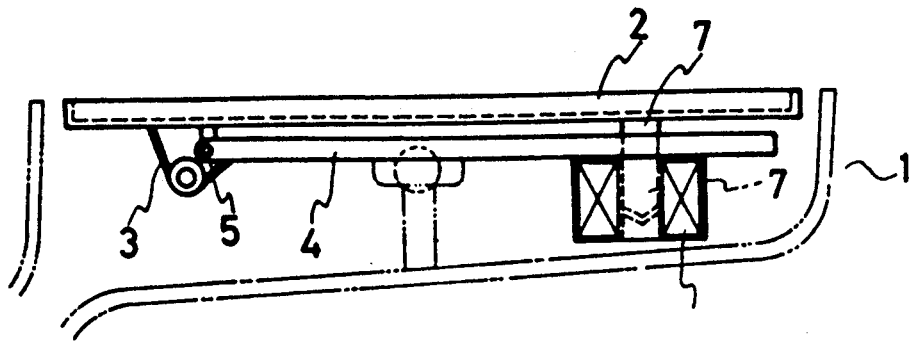
FIG. 2(a) is a sectional view of the outside back mirror device of the present invention.
Figure 2B:
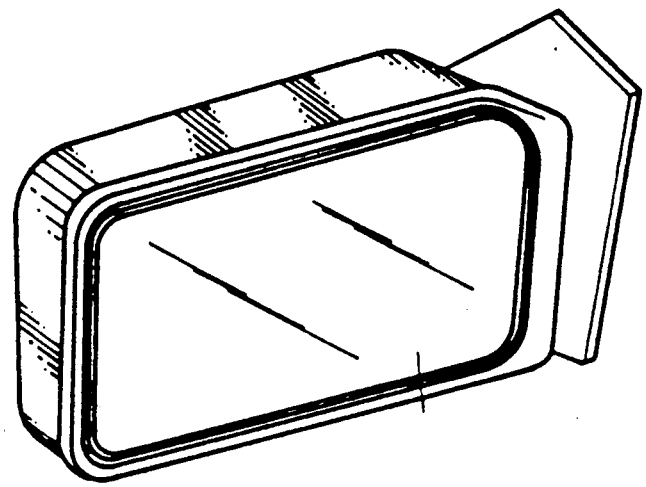
FIGS. 2(b) and 2(c) are perspective views of the outside back mirror device of the present invention.
Figure 2C:
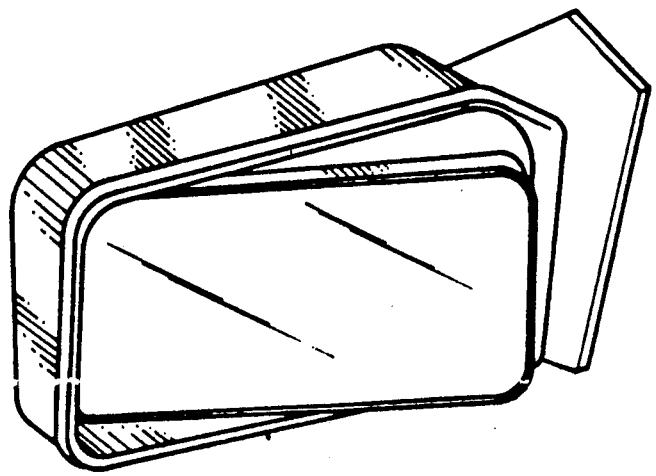

Referring now in detail to the drawings for the purpose of illustrating preferred embodiments of the present invention, the outside back mirror device as shown in FIGS. 2(a), 2(b), and 2(c), which includes a back mirror casing 1 including a mirror 2 which has a usual plane reflecting surface disposed therein, a supporting axis 5 disposed in the rear side of the mirror 2 for rotatably installing a fixing plate 4 of the back mirror casing 1, a solenoid 6 disposed on the fixing plate 4, a flanger 7 of the solenoid 6 so as to contact to the mirror 2, and a spring 3 disposed between the rear side of the mirror 2 and the casing 1 for causing the mirror 2 to return to its original position.

Figure 4A:
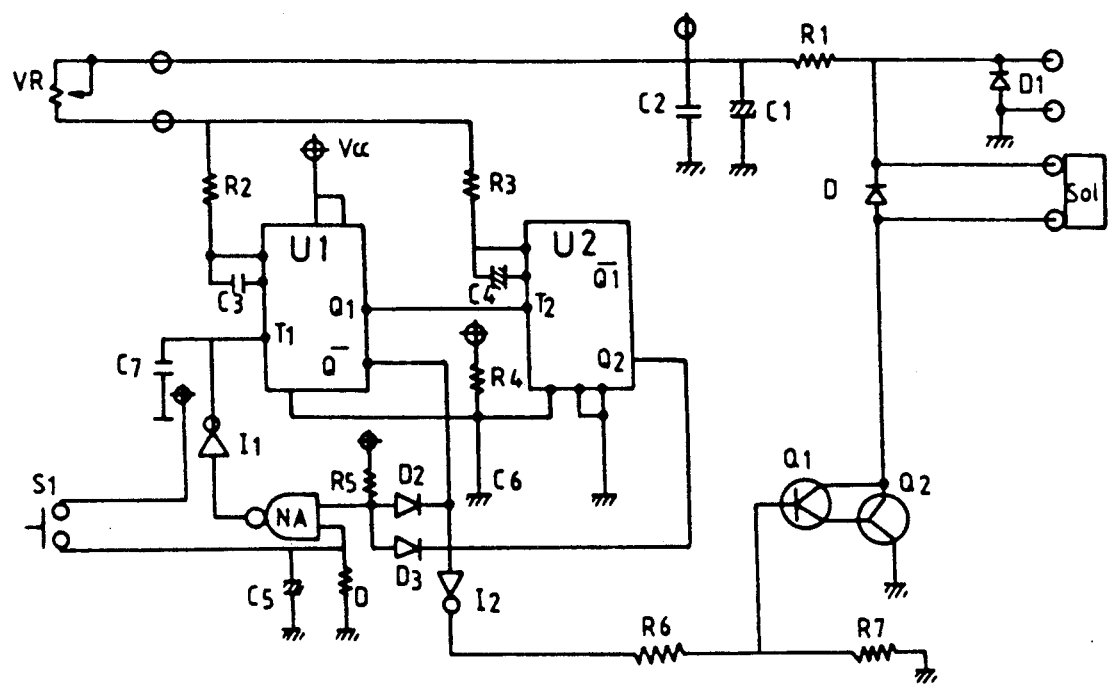
FIG. 4(a) is a circuit diagram of the outside back mirror of the present invention.
Figure 4B:
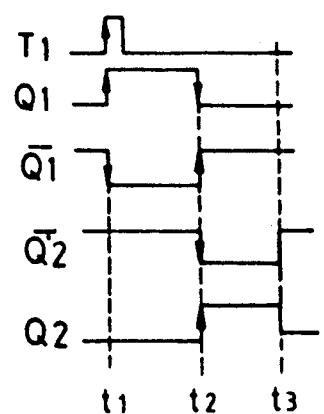
FIG. 4(b) is a waveform diagram of a solenoid drive circuit of the outside back mirror of the present invention.

A drive circuit of the solenoid 6 is illustrated in FIGS. 4(a) and 4(b) as follows:

As shown in FIG. 4(a), a power source (Vcc) is connected to resistance (R1) through a cathode end of diode (D1) with an anode being earthed and, at the same time, with the solenoid (Sol). The resistance (R1) is connected to a variable resistance (VR) through condensers (C1) and (C2) with one end being earthed. The variable resistance (VR) is connected directly to mono stable multivibrators (U1) and (U2) through resistances (R2) and (R3) and, at the same time, through condensers (C3) and (C4). A push switch (S1) with a power source impressed is connected to one input port of NAND gate (NA) through an earthed condenser (C5) and a resistance (R4). To the other input port of NAND gate (NA), the power source is impressed through a resistance (R5), and the input port of NAND gate (NA) is connected to a trigger input port (T1) of the mono stable multivibrator (U1) through a first invertor (I1) and one end of an earthed condenser (c6). The resistance connected to the input port of NAND gate (NA) is connected to a reversing output port (Q1) of the mono stable multivibrator (U1) and, at the same time, to a second invertor (I2) through a diode (D3). The reversing output port (Q1) of the mono stable multivibrator is connected to a reversing trigger input port (T2) of the mono stable multivibrator (U2) through the diode (D3). The invertor (I2) is connected to an earthed resistance (R7) and, at the same time, to a base port of a first transistor (TR1) through a resistance (R6). An emitter port of the first transistor (TR1) is connected to the base port of a second transistor (TR2) earthed to the emitter and a collector port of the first transistor (TR1) is connected to the solenoid (Sol) by being linked with the collector port of the second transistor (TR2).

At this time, the mono stable multivibrators (U1) and (U2) use a dual mono stable multivibrator (IC).

When the driver pushes the push switch (S1) as shown in FIG. 4(a) and the driver wants to change a traffic lane to pass another automobile ahead while in running, the input of NAND gate (NA) becomes "high" so that the output thereof becomes "low" and the output of invertor (I1) becomes "high". When the driver releases the push switch (S1), the output of invertor (I1) becomes "low" and trigger (T1) is thereby inputted. The output (Q1) of the mono stable multivibrator (UL) maintains a "high" condition during time constant fixed by variable resistance (VR) and the reversing output (Q1) of the mono stable multivibrator (U1) maintains a "low" condition for a given period of time so that the output of invertor (I2) becomes "high", by turning the transistor (TR1) and the transistor (TR2) on, and solenoid (Sol) is thereby made to operate.

The waveform of major part at this time can be expressed by the waveform between t1 and t2 as shown in FIG. 4(b). When the solenoid (Sol) operates, the flanger 7 thereof pushes the rear side of the mirror 2 and the mirror 2 changes its installed position to be located in the direction of imaginary line as shown in FIG. 2(a).

Figure 1A:
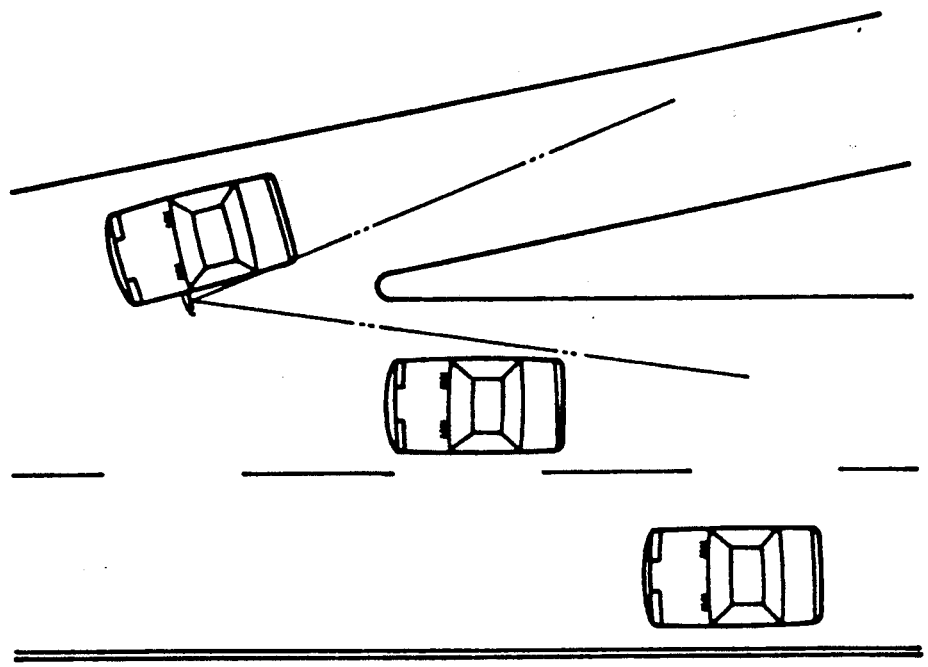
FIG. 1(a) illustrates the rear angle of an automobile by the conventional outside back mirror when the automobile is entered the travelling road from the entrance.
Figure 1B:
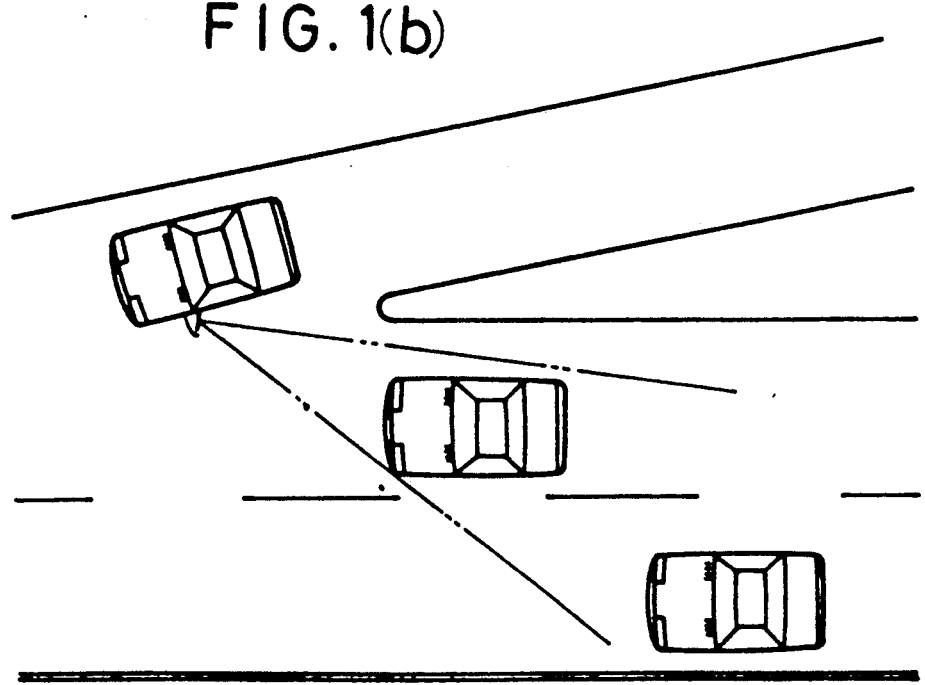
FIG. 1(b) illustrates the rear of angle of an automobile by the device of the present invention when the automobile is entered the travelling road from the entrance.
Figure 1C:
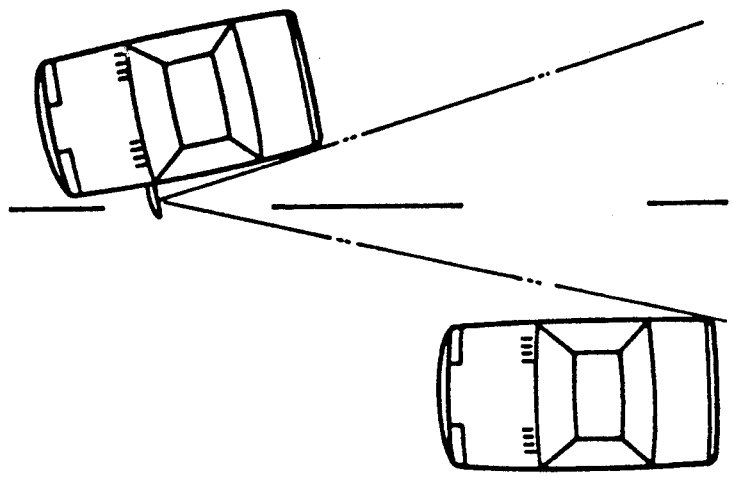
FIG. 1(c) illustrates the rear angle of an automobile by the conventional outside back mirror when the automobile is changed the traffic lane.
Figure 1D:
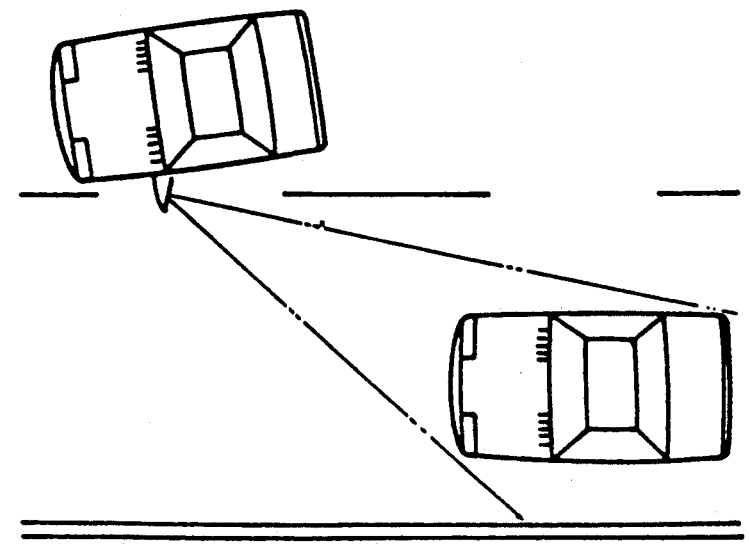
FIG. 1(d) illustrates the rear angle of an automobile by the device of the present invention when the automobile is changed the traffic lane.

When the mirror 2 moves to the extent of given angle in the above-described operation, it provides the driver only for a limited time with a wider range of reflection as shown in FIG. 1(b) or FIG. 1(d) than that it has provided and then returns to its original position.

Accordingly, the range of driver's observation widens outward by the angle-changed mirror and it becomes unnecessary for the driver to look back or to stick his head out of the window.

When the wide range of observation attains to t2 after the lapse of given time as shown in FIG. 4(b), the output (Q1) of the mono stable multivibrator (U1) becomes "low" and the reversing output thereof becomes "high". Then, the output of the second invertor (I2) becomes "low" and the transistors (TR1) and (TR2) are thereby made to turn off.

Consequently, electricity does not flow through the solenoid (Sol) and it ceases to operate. At this time, the restoring force of distorted spring acts on the outside back mirror and the mirror is thereby made to return to its original position.

Thus, the outside back mirror movement can be accomplished by those transformed embodiments based on the present invention. These embodiments are common in that a link lever which applies power to the surface of the mirror 2 is connected without the flanger 7 of the solenoid 6 in a condition where the solenoid 6 and the flanger 7 are not brought into contact with the mirror device 2.

Figure 3A:
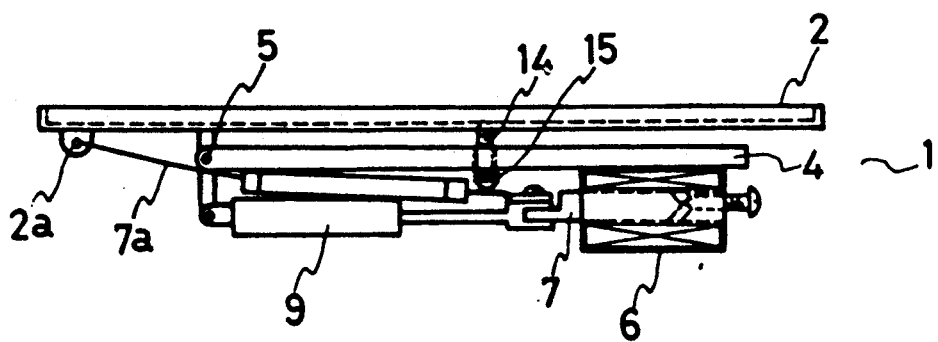
FIG. 3(a) is a sectional view of the second embodiment of the present invention.

FIG. 3(a) is a sectional view of the back mirror of the second embodiment of the present invention, wherein the mirror 2 is rotatably installed to the supporting axis 5 of the fixing plate 4 attached to the outside back mirror casing 1. The solenoid 6 is disposed between the fixing plate 4 and the outside back mirror casing 1. A shock absorber 9 which causes the outside back mirror 2 to move smoothly and a wire 7a which delivers power to the mirror 2 are fixed to the end of the solenoid 6, respectively. The end of shock absorber 9 is fixed to the fixing plate 4 and the end of wire 7a is fastened to a fixing hole of the mirror 2. When a fixing bolt 14 is fixed to the mirror 2 by inserting the fixing bolt 14 and a spring 15 disposed in a hole bored in the fixing plate 4, the elastic force of the spring 15 is applied to the fixing plate 4 at all times.

In the case where a power source is applied to the coil of solenoid 6 by pushing a direction indication change switch (not shown) installed in the inside of an automobile when a ramp or a lane is changed as shown in FIG. 2, the flanger 7 of the solenoid 6 and the shock absorber 9 move and the wire 7a is thereby pulled. Then the mirror 2 is made to turn round at a given angle with the supporting axis 5 as a supporting point.

When the mirror device 2 turns round, it is provided with a new range of reflection for the driver, which it is not able to provide to him and the driver can observe the rear side of his automobile without ascertaining it by looking back or sticking his head out of the window.

When the switch (S1) is pushed again thereafter, the power source is cut off form the coil of the solenoid 6 and the flanger 7 of solenoid 6 moves to its original position. At the same time, the restoring force of the spring 15 pressed onto the fixing plate 4 acts on the mirror 2 and then the mirror 2 returns to its original position. At this time, the shock absorber 9 maintains the restored condition of the mirror 2 satisfactorily.

Figure 3B:
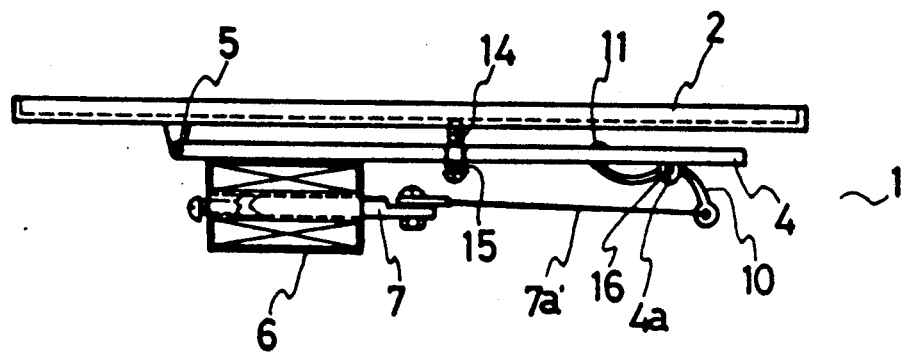
FIG. 3(b) is a sectional view of the third embodiment of the present invention.

FIG. 3(b) is a sectional view of the back mirror of the second embodiment of the present invention, wherein the mirror 2 is disposed in the supporting axis 5 of the fixing plate 4 which is fixed to the outside back mirror casing 1. The solenoid 6 is fixed to the fixing plate 4 in the condition where the fixing bolt 14 and the spring 15 are installed. A link lever 7a' and the shock absorber 9 are connected to the flanger 7 of fixed solenoid. An L-shaped rotary piece 10 connected to the front end of the link lever 7a' and with a roller 11 disposed at its front end is connected thereto. The rotary piece 10 is installed by means of a hinge pin 16 in the supporting plate 4a disposed formed in the place where a hole is bored. The roller 11 is formed so as to contact to the mirror 2. The fixing bolt 14 is fixed to the rear side of the mirror 2.

When the driver pushes the direction indication change switch (not shown) in the above-described formation, a power source is applied to the solenoid 6 and the linker lever 7a' is thereby pulled. The rotary piece 10 connected to the link lever 7a' turns round with the hinge pin 16 of the supporting plate 4a as a supporting point and pushes the mirror 2 from the hole and, at the same time, the shock absorber 9 operates and the spring 15 is compressed. The mirror 2 is thereby made to move at a given angle.

By the moved mirror 2, the driver can observe in the inside of his automobile with the range which he is not able to observe. Thus, it is not necessary for the driver to look back or stick his head out of the window in order to observe the rear side of his automobile.

Figure 3C:
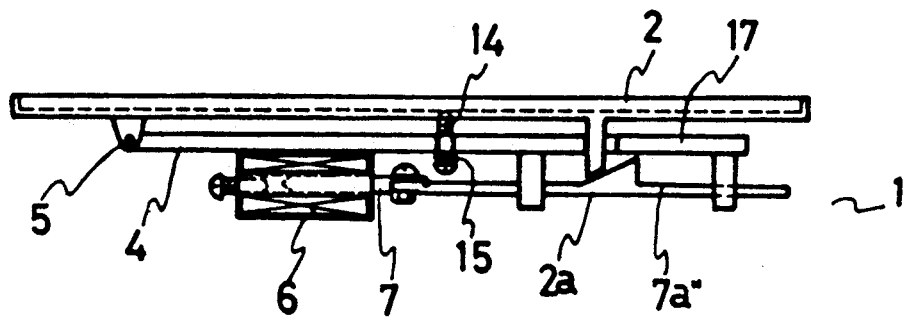
FIG. 3(c) is a sectional view of the fourth embodiment of the present invention.

FIG. 3(c) is a sectional view of back mirror device of the fourth embodiment of the present invention, wherein an inclined projection 2a is disposed in the mirror 2 in a condition where the solenoid 6 and the mirror 2 are installed in the fixing plate 4 disposed in the outside back mirror casing 1. The front end of a sliding plate 7a" is connected to the flanger 7 of the solenoid 6 which is inserted into the supporting plate 4a of fixing plate 4 but installed so as to contact to the projection 2a of the mirror 2 by projecting the inclined surface 17 from the sliding plate 7a.

When the driver is applied a power source to the solenoid 6 by pushing the direction indication change switch (not shown), the flanger 7 is pulled and the sliding plate 7a" moves and, with the movement of sliding plate 7a", the projected inclined surface 17 pushes out the projecting part 2a of the mirror 2 by its inclination. Therefore, the mirror 2 moves at an angle where a range which the driver cannot observe can be ascertained.

Accordingly, the driver can observe the rear side of his automobile without looking back or sticking his head out of the window. When he pushes the switch again, after making observation thereof, the power source is cut off from the solenoid 6 and the spring 15 restores the fixing bolt 14 fixed to the mirror 2. Therefore, the mirror 2 is thereby made to return to its original position.

As described hereinabove, the present invention is a useful for making the operation of a car efficiently by reason that the mirror can move automatically in the fixing plate fixed in the outside back mirror casing 1 by the forward and backward movement of the solenoid 6 and the driver's view is maximized for his same observing posture so that the accident can be eliminated and driver's fatigue can be reduced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An outside back mirror device having a mirror for use in an automobile, which comprises:
   an outside back mirror casing,
   a solenoid actuated by a drive circuit for turning on and off the power for a certain time period,
   a hydraulic member for receiving the force applied by said solenoid so as to make said mirror move,
   a shock absorber for delaying the return of said mirror to its original position, and
   an elastic member including a fixing bolt and a spring for causing said mirror to return to its original position.

2. The outside back mirror device of claim 1, wherein the drive circuit includes a NAND gate for generating a trigger signal according to the operation of a push switch and a time constant fixed by a variable resistance, first and second monostable multivibrators for generating a pulse according to said trigger signal, and transistors operatively associated with the solenoid according to the output of said first mono stable multivibrator and the solenoid interlocked with said transistors.

3. The outside back mirror device of claim 1, wherein a flanger of the hydraulic member touches the surface of the mirror for inclining the mirror.

4. The outside back mirror device of claim 1, wherein the hydraulic member includes a wire fixed the hydraulic member to the mirror for inclining the mirror.

5. The outside back mirror device of claim 1, wherein the hydraulic member includes a link lever and a rotary piece for inclining the mirror.

6. The outside back mirror device of claim 1, wherein the hydraulic member includes a sliding plate having a raised portion disposed on the middle of the sliding plate for inclining the mirror.

* * * * *